United States Patent
Nakamura et al.

(10) Patent No.: US 10,597,091 B2
(45) Date of Patent: Mar. 24, 2020

(54) VEHICLE FRONT BODY STRUCTURE

(71) Applicant: MAZDA MOTOR CORPORATION, Aki-gun, Hiroshima (JP)

(72) Inventors: Takeshi Nakamura, Hiroshima (JP); Keizo Kawasaki, Hiroshima (JP); Kazuki Yamauchi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 31 days.

(21) Appl. No.: 15/757,926

(22) PCT Filed: Jan. 5, 2017

(86) PCT No.: PCT/JP2017/000064
§ 371 (c)(1),
(2) Date: Mar. 6, 2018

(87) PCT Pub. No.: WO2017/126318
PCT Pub. Date: Jul. 27, 2017

(65) Prior Publication Data
US 2018/0244315 A1    Aug. 30, 2018

(30) Foreign Application Priority Data
Jan. 20, 2016    (JP) .................................. 2016-008987

(51) Int. Cl.
| | | |
|---|---|---|
| B62D 25/08 | (2006.01) | |
| B62D 25/02 | (2006.01) | |
| B62D 25/20 | (2006.01) | |

(52) U.S. Cl.
CPC ........... *B62D 25/08* (2013.01); *B62D 25/025* (2013.01); *B62D 25/2018* (2013.01); *B62D 25/2036* (2013.01); *B62D 25/2045* (2013.01)

(58) Field of Classification Search
CPC .. B62D 25/08; B62D 25/025; B62D 25/2018; B62D 25/2036; B62D 25/2045
See application file for complete search history.

(56) References Cited

U.S. PATENT DOCUMENTS 6,299,240 B1 * 10/2001 Schroeder .............. B62D 21/02
296/203.01

FOREIGN PATENT DOCUMENTS

| | | |
|---|---|---|
| JP | H789459 A | 4/1995 |
| JP | H7165118 A | 6/1995 |

(Continued)

OTHER PUBLICATIONS

ISA Japan Patent Office, International Search Report Issued in PCT Application No. PCT/JP2017/000064, dated Mar. 28, 2017, WIPO, 2 pages.

*Primary Examiner* — D Glenn Dayoan
*Assistant Examiner* — Melissa Ann Bonifazi
(74) *Attorney, Agent, or Firm* — Alleman Hall Creasman & Tuttle LLP

(57) ABSTRACT

To provide a vehicle front body structure including a side sill that extends in a vehicle front-rear direction and is located behind a position where a front wheel is disposed and a torque box extending from a front end of the side sill toward an inside in a vehicle width direction. In the vehicle front body structure, the torque box includes an upper surface portion disposed at a substantially same height as an upper surface of the side sill and a lower surface portion disposed at a substantially same height as a lower surface of the side sill. A reinforcing member is provided in an internal space surrounded by the upper surface portion and the lower surface portion of the torque box.

5 Claims, 13 Drawing Sheets

(56) References Cited

FOREIGN PATENT DOCUMENTS

JP            5239474 B     4/2013
JP            201596349 A     5/2015

\* cited by examiner

VEHICLE FRONT BODY STRUCTURE

TECHNICAL FIELD

The present invention relates to a front body structure around a hinge pillar in a vehicle, and belongs to a technical field of a vehicle front body structure.

BACKGROUND ART

Generally, during front collision of the vehicle, an impact load is absorbed by crushing a pair of right and left front side frames provided so as to extend in a vehicle front-rear direction in the front portion of the vehicle body, and the impact load is dispersed to each portion of the vehicle body through the front side frames, thereby preventing deformation of a vehicle interior.

In addition, there is known a vehicle body structure in which a front end of a side sill provided so as to extend in the vehicle front-rear direction on an outside in a vehicle width direction of the front side frame is coupled to the front side frame with a torque box interposed therebetween. In this case, torsion of the front side frame is prevented by the coupling to the side sill with the torque box interposed therebetween, which allows improvement of driving stability of the vehicle.

However, when what is called small overlap collision in which a collision object overlaps in the vehicle width direction a region (a region occupying about 25% of a vehicle body width on one side) on the outside in the vehicle width direction with respect to the front side frame occurs, the front wheel disposed in the overlap region recedes relative to the vehicle body, and the impact load is input from the front wheel to the hinge pillar, thereby deforming the vehicle interior in some cases.

For example, PTL 1 discloses a structure in order to prevent the deformation of the vehicle interior due to the small overlap collision. In the structure of PTL 1, an apron reinforcement extending from the upper end of the hinge pillar toward a vehicle front side and the hinge pillar are diagonally connected by a connecting member to enhance rigidity of coupling between the apron reinforcement and the hinge pillar, and a bulkhead member is provided at the height position of the connecting portion to the connecting member in a closed section of the hinge pillar, thereby enhancing the rigidity of the hinge pillar.

According to the vehicle body structure of PTL 1, the front wheel that recedes relatively during the small overlap collision abuts on the connecting member, so that the impact load input to the connecting member is dispersed to the hinge pillar and the apron reinforcement, and dispersed from the hinge pillar to the vehicle rear side through the side sill, the front pillar, or the like. Additionally, the rigidity of the hinge pillar to which the impact load is input from the front wheel through the connecting member is enhanced by the bulkhead member, whereby the load is successfully dispersed toward the vehicle rear side through the side sill, the front pillar, or the like. Consequently, deformation of the vehicle interior is prevented.

CITATION LIST

Patent Literature

PTL 1: Japanese Patent No. 5239474

SUMMARY OF INVENTION

Technical Problem

However, in the conventional countermeasure against the small overlap collision, because the impact load input from the front wheel to the hinge pillar side through the connecting member is intensively transmitted to a path extending toward the vehicle rear side such as the side sill and the front pillar, there is room for improvement on the dispersion of the impact load.

An object of the present invention is to provide a vehicle front body structure capable of enhancing the effect of dispersing the load on each portion of the vehicle body when such an impact load that the front wheel recedes relatively is input from the vehicle front side.

Solution to Problem

In order to solve the above problem, a vehicle front body structure according to the present invention is configured as follows.

According to a first aspect of the present invention, a vehicle front body structure includes: a side sill that extends in a vehicle front-rear direction and is located behind a position where a front wheel is disposed; and a torque box extending from a front end of the side sill toward an inside in a vehicle width direction. The torque box includes an upper surface portion disposed at a substantially same height as an upper surface of the side sill and a lower surface portion disposed at a substantially same height as a lower surface of the side sill.

According to a second aspect of the present invention, in the first aspect, the torque box includes an internal space surrounded by the upper surface portion and the lower surface portion, and a reinforcing member is provided in the internal space.

According to a third aspect of the present invention, in the second aspect, the reinforcing member is a plate-shaped member partitioning the internal space in the vehicle width direction.

According to a fourth aspect of the present invention, in any one of the first to third aspects, the front end of the side sill is made of a material having lower tensile strength than a material for the torque box.

Advantageous Effects of Invention

According to the first aspect, when such an impact load that the front wheel recedes relative to the vehicle body is input from the vehicle front side, the impact load that is input from the front wheel to the front end of the side sill through the hinge pillar or the like or directly input to the front end of the side sill is dispersed toward the vehicle rear side through the side sill, and effectively dispersed from the upper surface portion and the lower surface portion of the side sill to the upper surface portion and the lower surface portion of the torque box. Consequently, the load can be dispersed in a vehicle body skeleton member such as the front side frame from the front end of the side sill toward the inside in the vehicle width direction using the torque box provided to improve the driving stability of the vehicle. Thus, the impact load can effectively be dispersed to each portion of the vehicle body, thereby effectively preventing the deformation of the vehicle interior.

According to the second aspect, the reinforcing member is provided in the internal space of the torque box, so that the deformation of the torque box can be prevented. Consequently, the load is successfully transmitted to the inside in the vehicle width direction through the upper surface portion and the lower surface portion by preventing the deformation of the upper surface portion and the lower surface portion of the torque box, so that the load can effectively be dispersed to each portion of the vehicle body.

According to the third aspect, the plate-shaped member partitioning the internal space of the torque box in the vehicle width direction is used as the reinforcing member, while reducing the material cost of the reinforcing member, so that the load can effectively be dispersed to the inside in the vehicle width direction through the upper surface portion and the lower surface portion of the torque box.

According to the fourth aspect, when the impact load from the front wheel that recedes relative to the vehicle body is input to the front end of the side sill through the hinge pillar or the like or directly input to the front end of the side sill, the front end of the side sill is crushed to effectively absorb the impact energy, and the load can effectively be dispersed to the inside in the vehicle width direction through the upper surface portion and the lower surface portion of the torque box made of a material which is not easily crushed compared with the front end of the side sill.

DESCRIPTION OF EMBODIMENT

Figure 1:
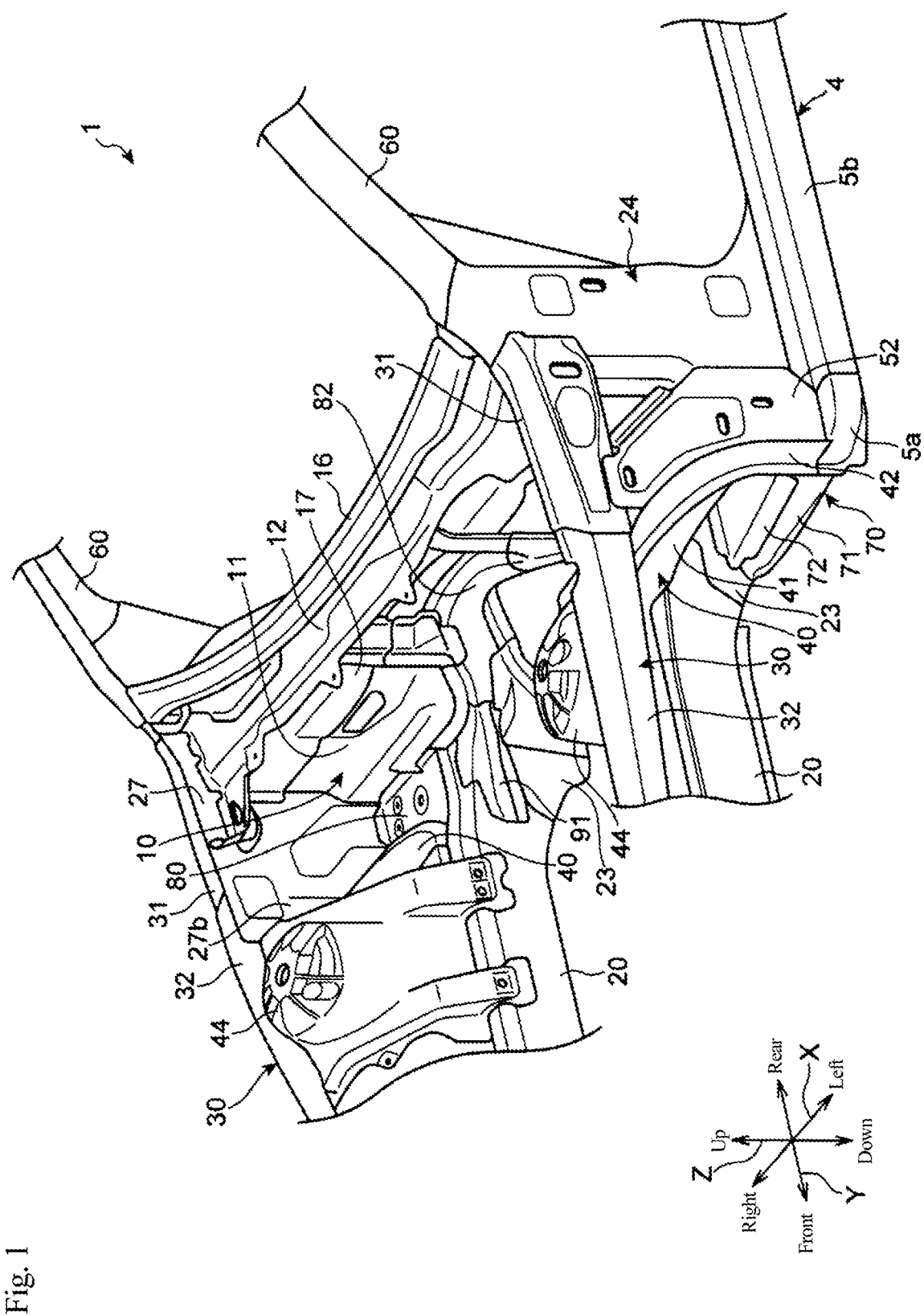
FIG. 1 is a perspective view illustrating a vehicle front body structure according to an embodiment of the present invention.

Hereinafter, details of a vehicle front body structure according to the present invention will be described with reference to the accompanying drawings. In the following description, unless otherwise specified, the term indicating a direction such as "front", "rear", "right", "left", "up", "down" and the like is referred to as each direction of the vehicle body when a traveling direction during forward traveling of the vehicle is defined as "front". In the accompanying drawings, a sign "X" is attached to the vehicle width direction, a sign "Y" is attached to the vehicle front-rear direction, and a sign "Z" is attached to the vehicle vertical direction.

As illustrated in FIGS. 1 to 4, an automobile 1 having a front body structure according to the embodiment includes a floor panel 2 (see FIG. 4), a pair of left and right side sills 4, a dash panel 10, a pair of right and left side inner panels 27, a pair of left and right hinge pillars 24, a pair of left and right front side frames 20, a pair of left and right apron reinforcements 30, and a pair of right and left wheel houses 40.

The side sill 4 is provided so as to extend in the vehicle front-rear direction along an end portion in the vehicle width direction of the floor panel 2. The side sill 4 includes a side sill outer 5 (5a, 5b), which has a hat shape in section and is opened inward in a vehicle width direction X, and a side sill inner 6, which has a hat shape in section and is opened outward in the vehicle width direction X. The side sill outer 5 is divided into a front side sill outer 5a constituting a front end of the side sill outer 5 and a rear side sill outer 5b extending from a rear end of the front side sill outer 5a to a rear side of the vehicle body. The rear side sill outer 5b is coupled to the outside in the vehicle width direction X of the side sill inner 6. In the rear side sill outer 5b, a closed section continuous in a vehicle front-rear direction Y is formed between the rear side sill outer 5b and the side sill inner 6. In the description, the closed section is referred to as a "closed section of the side sill 4".

The dash panel 10 is provided so as to extend in the vehicle width direction X across the left and right hinge pillars 24, whereby a vehicle interior space and an engine room are partitioned in the vehicle front-rear direction Y. The dash panel 10 includes a dash panel lower 11 rising from the front end of the floor panel 2 toward a vehicle upper side and a dash panel upper 12 coupled to an upper end of the dash panel lower 11.

A belt-shaped reinforcing panel 17 extending in the vehicle width direction X is coupled to a front surface in an upper portion of the dash panel lower 11. The upper end of the reinforcing panel 17 is coupled to the lower surface of the dash panel upper 12. A cowl inner panel 15 extending in the vehicle width direction X is coupled to the rear end of the dash panel upper 12, and a cowl outer panel 16 extending in the vehicle width direction X is coupled onto the vehicle front side of the cowl inner panel 15.

The side inner panel 27 is a member constituting a side surface portion of the front portion of the vehicle body. The side inner panel 27 constitutes a hinge pillar inner 27a in a portion located on the vehicle rear side with respect to the dash panel lower 11, and constitutes a cowl side panel 27b in a portion located on the vehicle front side of the dash panel lower 11.

Alternatively, the hinge pillar inner 27a and the cowl side panel 27b may be made of different members. Further, the hinge pillar inner 27a may be constructed with a plurality of members, or the cowl side panel 27b may be constructed with a plurality of members.

The hinge pillar 24 is provided so as to extend upward from a vicinity of the front end of the side sill 4. The hinge pillar 24 is disposed on the vehicle rear side with respect to the front side sill outer 5*a*. The hinge pillar 24 includes the hinge pillar inner 27*a* and a hinge pillar outer 25 disposed outside the vehicle interior.

Figure 6:
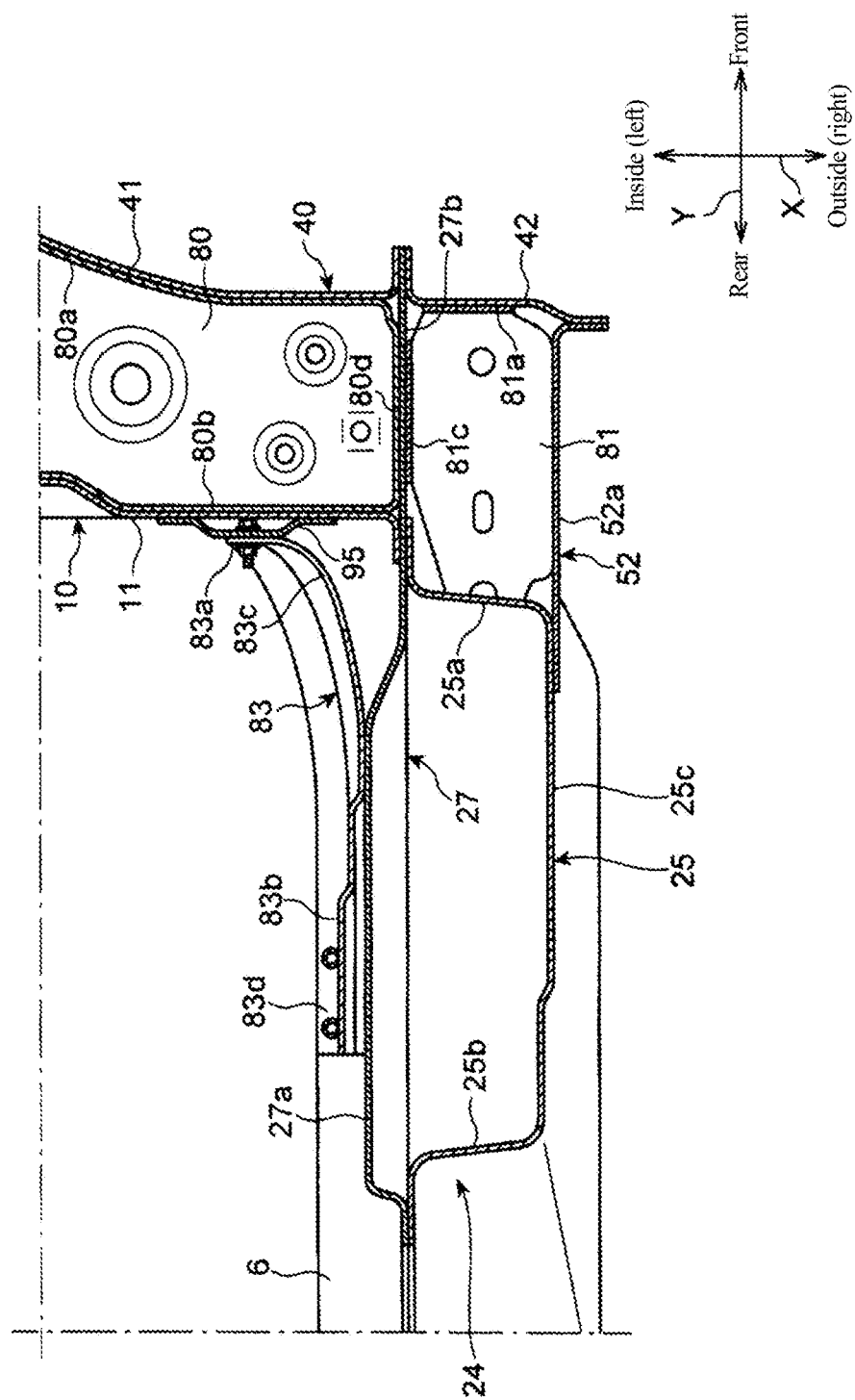
FIG. 6 is a sectional view taken along a line B-B in FIG. 2, and illustrates an apron rear panel and its periphery when viewed from above.

As illustrated in FIG. 6, the hinge pillar outer 25 includes a side surface portion 25*c* that is disposed on the outside in the vehicle width direction X of the hinge pillar inner 27*a* at a distance from the hinge pillar inner 27*a* while facing the hinge pillar inner 27*a*, and a front surface portion 25*a* extending from an edge on the vehicle front side of the side surface portion 25*c* toward the inside in the vehicle width direction X, and a rear surface portion 25*b* extending from the edge on the vehicle rear side of the side surface portion 25*c* toward the inside in the vehicle width direction X, and the hinge pillar outer 25 is formed into a hat shape in section, the hat shape being opened to the inside in the vehicle width direction X as a whole. The end on the inside in the vehicle width direction X of each of the front surface portion 25*a* and the rear surface portion 25*b* is coupled to the hinge pillar inner 27*a*, whereby a closed section continuous in a vehicle vertical direction Z is formed between the hinge pillar outer 25 and the hinge pillar inner 27*a*. In the description, the closed section is referred to as a "closed section of the hinge pillar 24".

Figure 2:
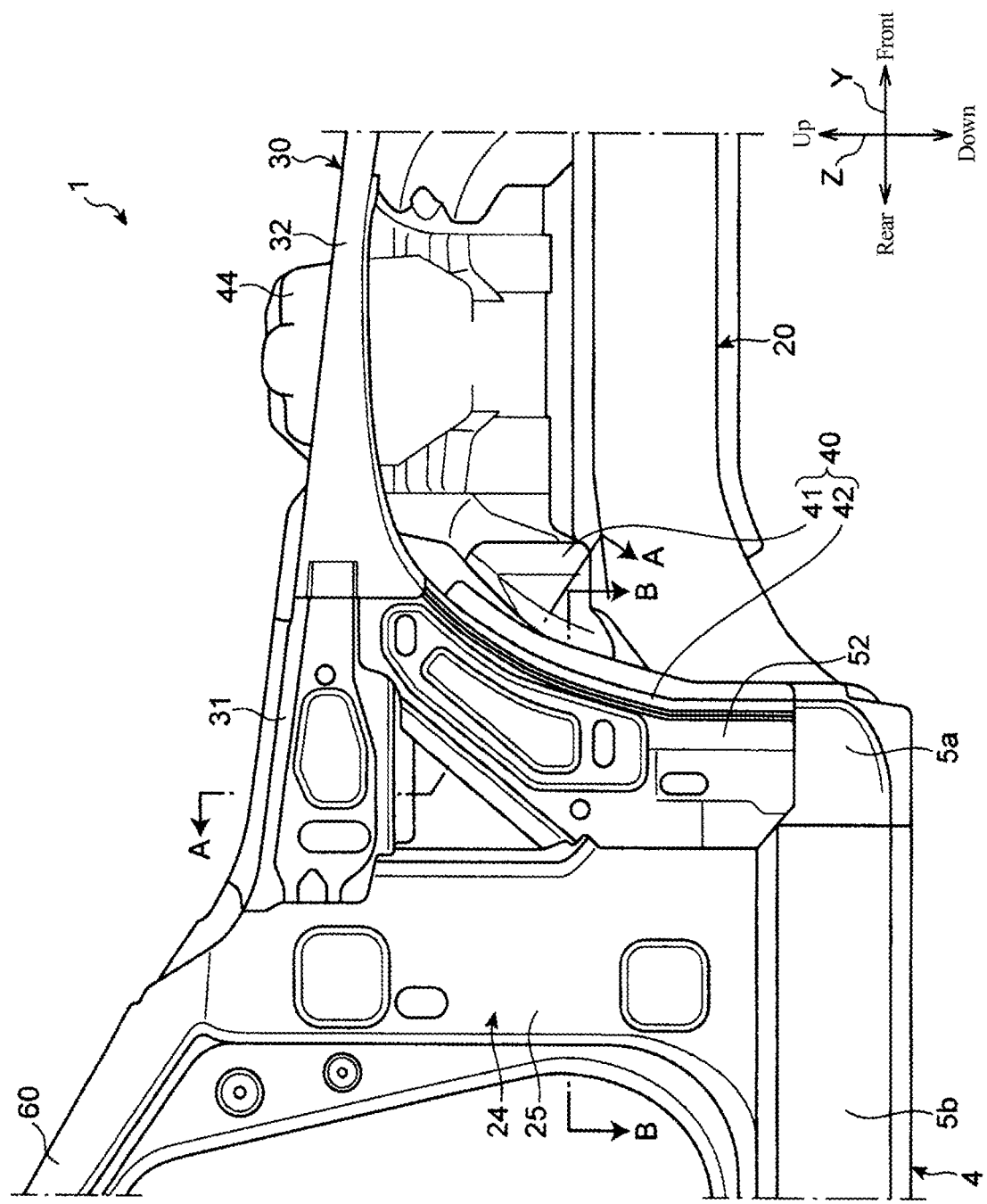
FIG. 2 is a side view of a vehicle body in FIG. 1 when viewed from a right side of the vehicle body.

As illustrated in FIGS. 1 and 2, the front side frame 20 is provided so as to extend in the vehicle front-rear direction on the vehicle front side of the dash panel 10. The front side frame 20 is disposed on the inside in the vehicle width direction X with respect to the side sill 4 and on the upper side in the vehicle vertical direction Z. The rear end of the front side frame 20 is connected to the front end of the side frame 23 extending in the vehicle front-rear direction Y along the lower surface of the floor panel 2.

Figure 9:
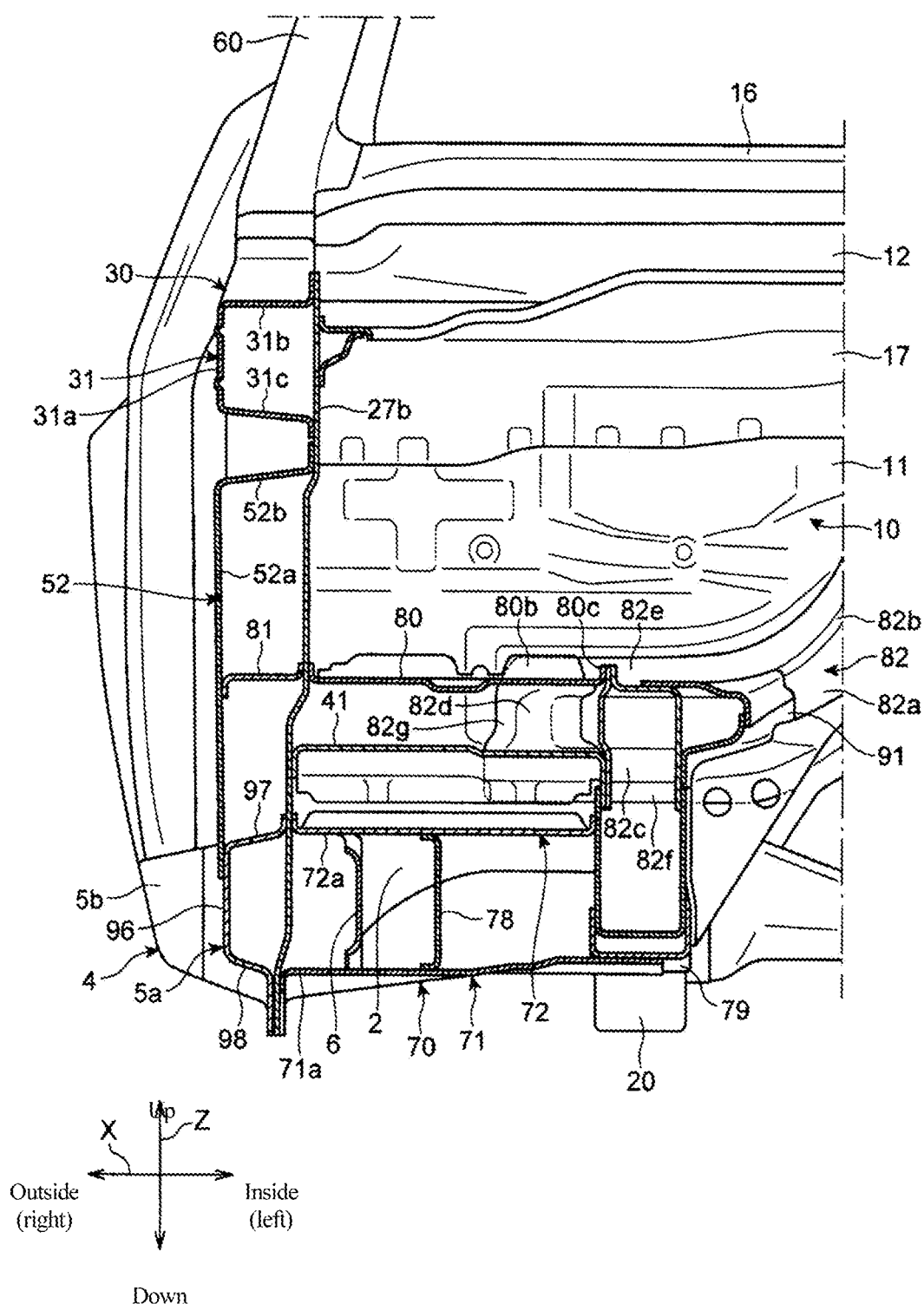
FIG. 9 is a sectional view taken along a line C-C in FIG. 8, and illustrates the apron rear panel and its periphery when viewed from the front side of the vehicle body.

As illustrated in FIGS. 1 and 9, the apron reinforcement 30 is provided so as to extend in the vehicle front-rear direction Y on the outside in the vehicle width direction X with respect to the front side frame 20. The apron reinforcement 30 includes a rear apron reinforcement 31 extending from the upper end of the hinge pillar 24 toward the vehicle front side and a front apron reinforcement 32 extending further from the front end of the rear apron reinforcement 31 toward the vehicle front side.

Figure 5:
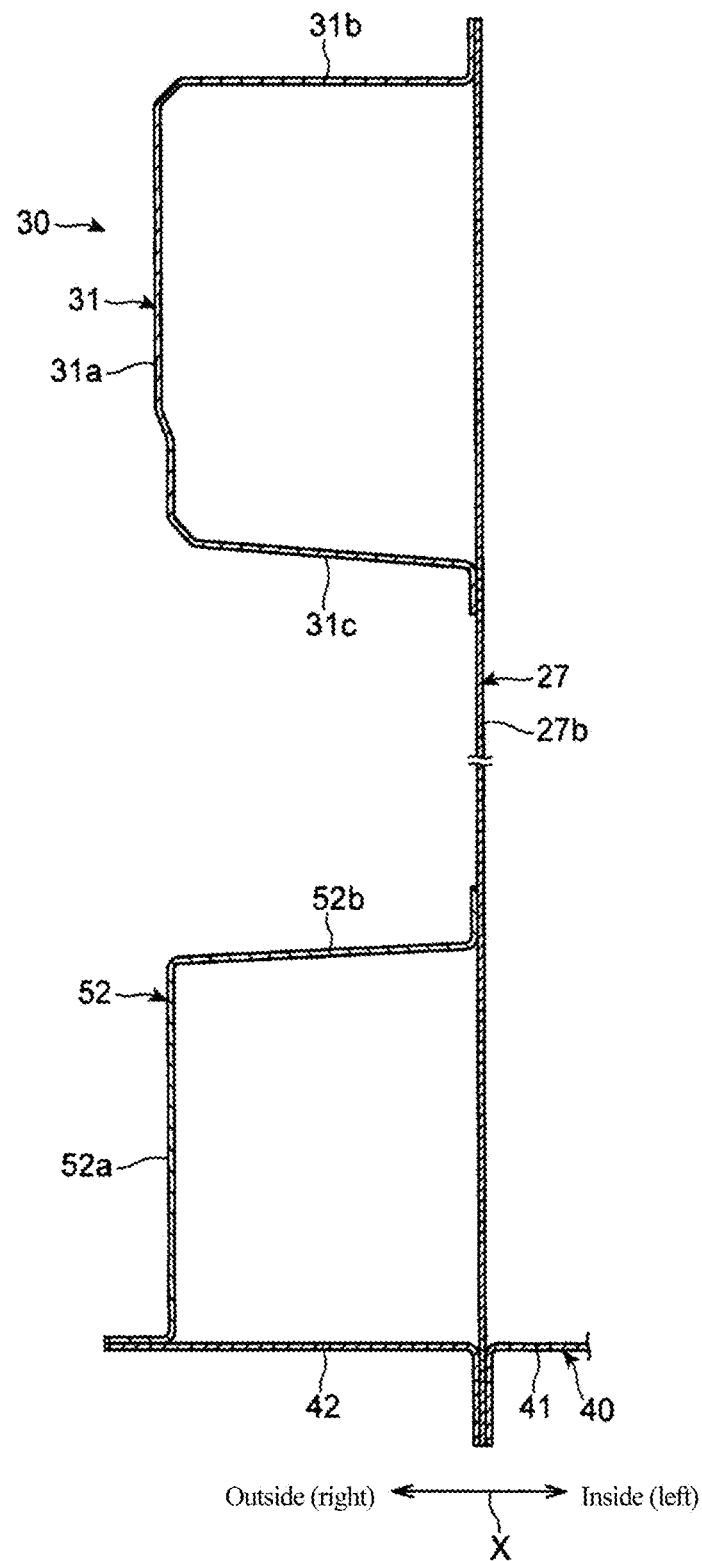
FIG. 5 is a sectional view taken along a line A-A in FIG. 2, and illustrates sectional shapes of an apron reinforcement and a connecting member.

As illustrated in FIG. 5, the rear apron reinforcement 31 is a member having a hat shape in section, and the rear apron reinforcement 31 includes a side surface portion 31*a* that is disposed on the outside in the vehicle width direction X of the cowl side panel 27*b* at a distance from the cowl side panel 27*b* while facing the cowl side panel 27*b*, and an upper surface portion 31*b* extending from the upper edge of the side surface portion 31*a* toward the inside in the vehicle width direction X, and a lower surface portion 31*c* extending from the lower edge of the side surface portion 31*a* toward the inside in the vehicle width direction X. The end on the inside in the vehicle width direction X of each of the upper surface portion 31*b* and the lower surface portion 31*c* is coupled to the cowl side panel 27*b*, whereby a closed section continuous in the vehicle front-rear direction Y is formed between the cowl side panel 27*b* and the rear apron reinforcement 31. In the description, the closed section is referred to as a "closed section of the apron reinforcement 30". The rear apron reinforcement 31 and the front apron reinforcement 32 may integrally be provided.

Figure 4:
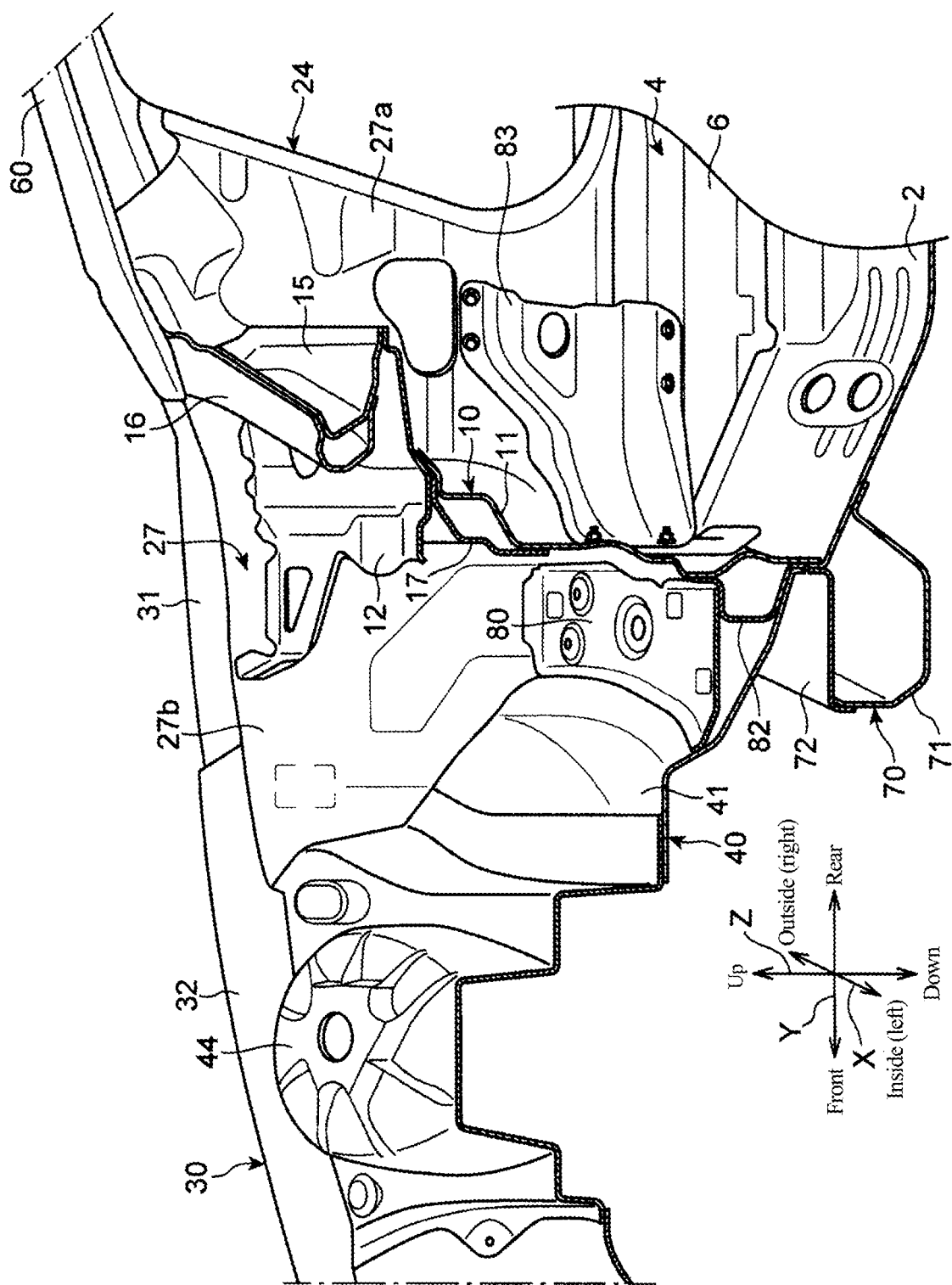
FIG. 4 is a partially broken perspective view of a right side portion of a front portion of the vehicle body when viewed from diagonally above the inside in the vehicle width direction.

As illustrated in FIGS. 1 and 4, the wheel house 40 is disposed on the vehicle front side of the dash panel 10, and a front wheel (not illustrated) is accommodated in the wheel house 40. As illustrated in FIG. 5, the wheel house 40 includes a wheel house inner 41 disposed on the inside in the vehicle width direction X of the cowl side panel 27*b* and a wheel house outer 42 disposed on the outside of the cowl side panel 27*b*. The wheel house inner 41 and the wheel house outer 42 are mutually coupled to each other with the cowl side panel 27*b* interposed therebetween.

As illustrated in FIGS. 1 and 4, the wheel house 40 includes a suspension housing 44 in which a front wheel suspension member (not illustrated) is accommodated. Although the suspension housing 44 is coupled to the wheel house inner 41, the suspension housing 44 may be provided integrally with the wheel house inner 41. The suspension housing 44 is attached while spreading over the front side frame 20 and the front apron reinforcement 32.

The wheel house inner 41 is coupled to the dash panel lower 11 at the rear end of the wheel house inner 41 (see FIG. 10), coupled to the front side frame 20 at the inside end in the vehicle width direction X, and coupled to the cowl side panel 27*b* at the outside end in the vehicle width direction X.

As illustrated in FIG. 5, the wheel house outer 42 is coupled to the cowl side panel 27*b* at the inside end in the vehicle width direction X of the wheel house outer 42, and coupled to the connecting member 52 (to be described below) at the outside end.

As illustrated in FIG. 2, the connecting member 52 is disposed on the lower side of the rear apron reinforcement 31, and diagonally connects the apron reinforcement 30 and the hinge pillar 24. The connecting member 52 is disposed so as to extend upward from the lower end of the hinge pillar 24 toward a direction inclined to the vehicle front side.

As illustrated in FIG. 5, the connecting member 52 is a member having an L-shape in section, and includes a side surface portion 52*a* that is disposed on the outside in the vehicle width direction X of the cowl side panel 27*b* at a distance from the cowl side panel 27*b* while facing the cowl side panel 27*b* and a rear surface portion 52*b* extending from the rear edge of the side surface portion 52*a* toward the inside in the vehicle width direction X. An end on the outside in the vehicle width direction X of the wheel house outer 42 is coupled to the front edge of the side surface portion 52*a*. The end on the inside in the vehicle width direction X of the rear surface portion 52*b* is coupled to the cowl side panel 27*b*.

As illustrated in FIG. 2, the upper end of the side surface portion 52*a* of the connecting member 52 is coupled to the front end of the rear apron reinforcement 31. The side surface portion 52*a* is provided so as to extend downward below the lower end of the rear surface portion 52*b*, and the lower end of the side surface portion 52*a* is coupled to the front side sill outer 5*a*.

Figure 3:
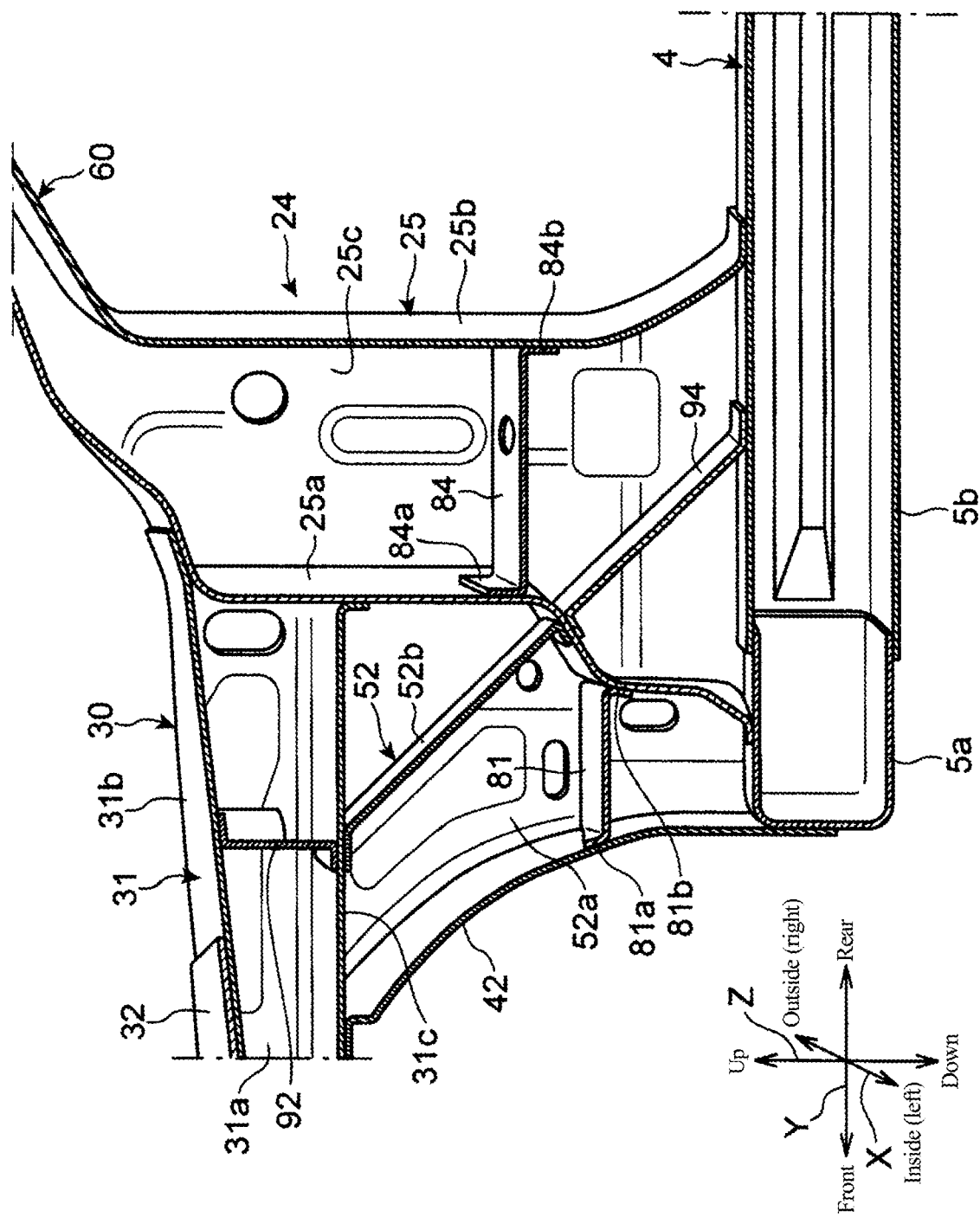
FIG. 3 is a sectional view of an internal structure of a hinge pillar and its periphery when viewed from an inside in a vehicle width direction.

As illustrated in FIG. 3, the rear surface portion 52*b* of the connecting member 52 is coupled to the lower surface portion 31*c* of the rear apron reinforcement 31 at the upper end of the rear surface portion 52*b*, and coupled to the front surface portion 25*a* of the hinge pillar outer 25 at the lower end of the rear surface portion 52*b*.

In the portion where the coupling portion between the rear surface portion 52*b* of the connecting member 52 and the lower surface portion 31*c* of the rear apron reinforcement 31 is located in the vehicle front-rear direction Y, a plate-shaped bulkhead member 92 is provided in the closed section of the apron reinforcement 30. The bulkhead member 92 is disposed at substantially right angles in the vehicle front-rear direction Y, and coupled to the side surface portion 33*a*, the upper surface portion 31*b*, and the lower surface portion 31*c* of the rear apron reinforcement 31 and the cowl side panel 27*b*.

A tabular reinforcing member 94 provided in the closed section of the hinge pillar 24 is disposed obliquely below the vehicle rear side of the rear surface portion 52b of the connecting member 52. The reinforcing member 94 is provided so as to extend obliquely upward toward the vehicle front side from the upper surface of the rear side sill outer 5b to the front surface portion 25a of the hinge pillar outer 25. The reinforcing member 94 is disposed on the substantially same straight line as the rear surface portion 52b of the connecting member 52 when viewed from the inside in the vehicle width direction X.

In a height range where the rear surface portion 52b of the connecting member 52 is located in the vehicle vertical direction Z, a closed section is formed among the side surface portion 52a and the rear surface portion 52b of the connecting member 52, the cowl side panel 27b, and the wheel house outer 42. In a height range below the rear surface portion 52b of the connecting member 52 and the height range where the side surface portion 52a is located in the vehicle vertical direction Z, a closed section is formed among the side surface portion 52a of the connecting member 52, the cowl side panel 27b, the wheel house outer 42, and the front surface portions 25a of the hinge pillar outer 25. These closed sections continue to each other in a lengthwise direction of the connecting member 52. Hereinafter, these closed sections are collectively referred to as a "closed section of the connecting member 52".

Figure 7:
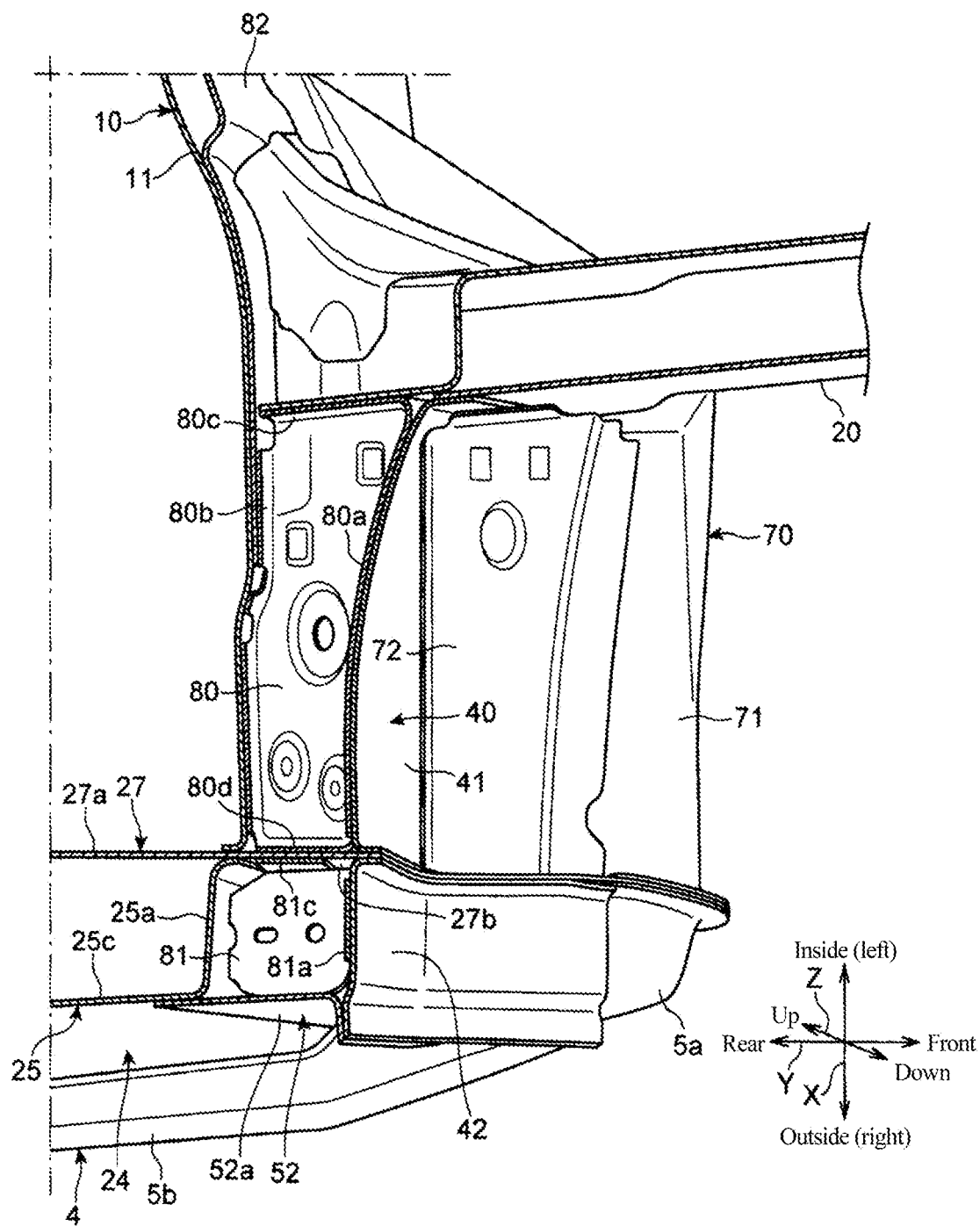
FIG. 7 is a partially broken perspective view of the vehicle body in FIG. 6 when viewed from obliquely above a front side of the vehicle body.
Figure 8:
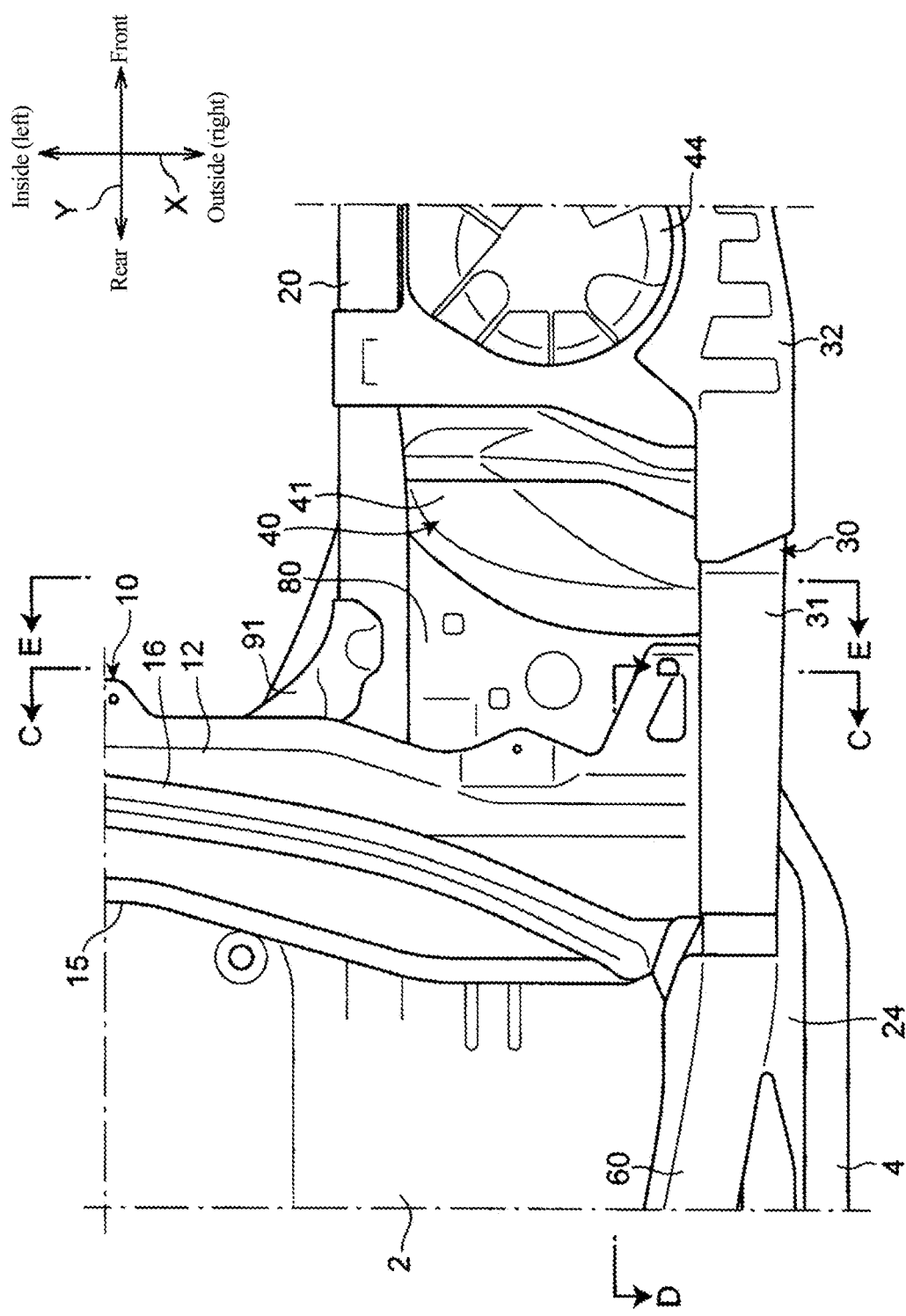
FIG. 8 is a plan view illustrating the apron rear panel and its periphery.

As illustrated in FIGS. 1, 4, and 6 to 9, an apron rear panel 80 is provided between the rear portion of the wheel house 40 and the dash panel 10. Specifically, as illustrated in FIGS. 6 and 7, the apron rear panel 80 is disposed so as to spread over the wheel house inner 41 and the dash panel lower 11, and connects the apron rear panel 80 and the wheel house inner 41 to each other. The apron rear panel 80 is disposed so as to spread over the cowl side panel 27b and the front side frame 20, and connects the cowl side panel 27b and the front side frame 20 to each other.

The apron rear panel 80 is a substantially quadrangular plate material elongated in the vehicle width direction X, and is disposed at substantially right angles in the vehicle vertical direction Z. A front flange 80a rising upward, a rear flange 80b rising upward, an inner flange 80c, and an outer flange 80d are provided at the edges on the vehicle front side, the vehicle rear side, the inside in the vehicle width direction X, and the outside in the vehicle width direction X of the apron rear panel 80.

As illustrated in FIG. 7, the front flange 80a of the apron rear panel 80 is coupled to the wheel house inner 41, the rear flange 80b is coupled to the dash panel lower 11, the inner flange 80c is connected to the front side frame 20, and the outer flange 80d is coupled to the cowl side panel 27b.

As illustrated in FIGS. 6 and 7, the apron rear panel 80 is disposed adjacent to the inside in the vehicle width direction X of the connecting member 52 with the cowl side panel 27b interposed therebetween. In the closed section of the connecting member 52, a reinforcing member 81 is provided in a portion adjacent to the outside in the vehicle width direction X of the apron rear panel 80.

The reinforcing member 81 is a plate-shaped bulkhead member disposed at substantially right angles in the vehicle vertical direction Z. The reinforcing member 81 partitions the internal space formed among the connecting member 52, the cowl side panel 27b, the wheel house outer 42, and the hinge pillar outer 25 in the vehicle vertical direction Z. Thus, the rigidity of the connecting member 52 is enhanced because the reinforcing member 81 is provided in the closed section of the connecting member 52.

A plurality of flanges 83a, 81c are provided on the peripheral edge of the reinforcing member 81. In the flanges 83a, 81c, the reinforcing member 81 is coupled to the wheel house outer 42, the front surface portion 25a of the hinge pillar outer 25, the cowl side panel 27b, and the side surface portion 52a of the connecting member 52.

As illustrated in FIG. 9, the apron rear panel 80 is disposed adjacent to the inside in the vehicle width direction X of the reinforcing member 81 with the cowl side panel 27b interposed therebetween, and disposed at the approximately same height as the reinforcing member 81 in the closed section of the connecting member 52 in the vehicle vertical direction Z.

The apron rear panel 80 and the reinforcing member 81 do not need to be disposed at the completely same height, but are preferably disposed so as to overlap each other in the vehicle vertical direction Z. In particular, preferably the apron rear panel 80 and the reinforcing member 81 overlap each other in the vehicle vertical direction Z in the coupling portion to the cowl side panel 27b.

Consequently, when such an impact load that the front wheel recedes relative to the vehicle body is input from the vehicle front side, a part of the load input to the connecting member 52 from the front wheel through the wheel house outer 42 is effectively dispersed from the reinforcing member 81 to the apron rear panel 80 through the cowl side panel 27b. The load transmitted to the apron rear panel 80 is further dispersed to various portions of the vehicle body through the dash panel lower 11, the front side frame 20, and the like.

As illustrated in FIGS. 1, 4, 7, and 9, a reinforcing member 82 extending in the vehicle width direction X is coupled to the front surface of the dash panel lower 11. As illustrated in FIG. 1, the reinforcing member 82 is curved such that a center portion in the lengthwise direction of the reinforcing member 82 swells rearward and upward according to a shape of a floor tunnel. As illustrated in FIG. 4, the reinforcing member 82 is a member having a hat shape in section, the hat shape being opened onto the vehicle rear side, and the reinforcing member 82 forms a closed section continues to the dash panel lower 11 in the vehicle width direction X. In the description, the closed section is referred to as a "closed section of the reinforcing member 82".

As illustrated in FIG. 9, the reinforcing member 82 includes a front surface portion 82a that is provided on the vehicle front side of the dash panel lower 11 at a distance from the dash panel lower 11 while facing the dash panel lower 11, an upper surface portion 82b extending toward the vehicle rear side from the upper edge of the front surface portion 82a to the dash panel lower 11, a lower surface portion 82c extending toward the vehicle rear side from the lower edge of the front surface portion 82a to the dash panel lower 11, a side surface portion 82d extending toward the vehicle rear side from the end in the lengthwise direction of the front surface portion 82a to the dash panel lower 11, an upper flange 82e that extends upward from the end on the vehicle rear side of the upper surface portion 82b and is coupled to the dash panel lower 11, a lower flange 82f that extends downward from the end on the vehicle rear side of the lower surface portion 82c and is coupled to the dash panel lower 11, and a side flange 82g extending outwardly in the vehicle width direction X from the end on the vehicle rear side of the side surface portion 82d and is coupled to the dash panel lower 11.

The reinforcing member 82 is connected to the rear end of the front side frame 20 with a root reinforcement 91 interposed therebetween. The root reinforcement 91 is attached so as to spread over the inside in the vehicle width direction X above the rear end of the front side frame 20 and the front surface side of the reinforcing member 82.

The reinforcing member 82 is disposed so as to overlap the wheel house inner 41 in front view of the vehicle body. The lower flange 82f of the reinforcing member 82 is sandwiched between the rear end of the wheel house inner 41 and the dash panel lower 11. Consequently, when the impact load is input to the wheel house inner 41 from the front wheel receding relative to the vehicle body, the impact load is effectively dispersed from the wheel house inner 41 to the reinforcing member 82.

The reinforcing member 82 is disposed while overlapping the apron rear panel 80 in front view of the vehicle body. Specifically, the upper flange 82e of the reinforcing member 82 overlaps the rear flange 80b of the apron rear panel 80 in front view of the vehicle body, and in an overlapping region, the rear flange 80b of the apron rear panel 80 is directly coupled to the upper flange 82e of the reinforcing member 82, and indirectly coupled to the dash panel lower portion 11 with the upper flange 82e interposed therebetween.

Consequently, the load dispersed from the relatively receding front wheel to the apron rear panel 80 through the wheel house outer 42, the connecting member 52, the reinforcing member 81 in the closed section of the connecting member 52, and the cowl side panel 27b is effectively dispersed in the reinforcing member 82. The load input from the apron rear panel 80 to the end in the lengthwise direction of the reinforcing member 82 is transmitted to the inside in the vehicle width direction X along the reinforcing member 82 while dispersed in the dash panel lower 11, and the load is dispersed from the central portion in the lengthwise direction of the reinforcing member 82 to the vehicle rear side through the floor tunnel 3 (see FIG. 11).

Figure 10:
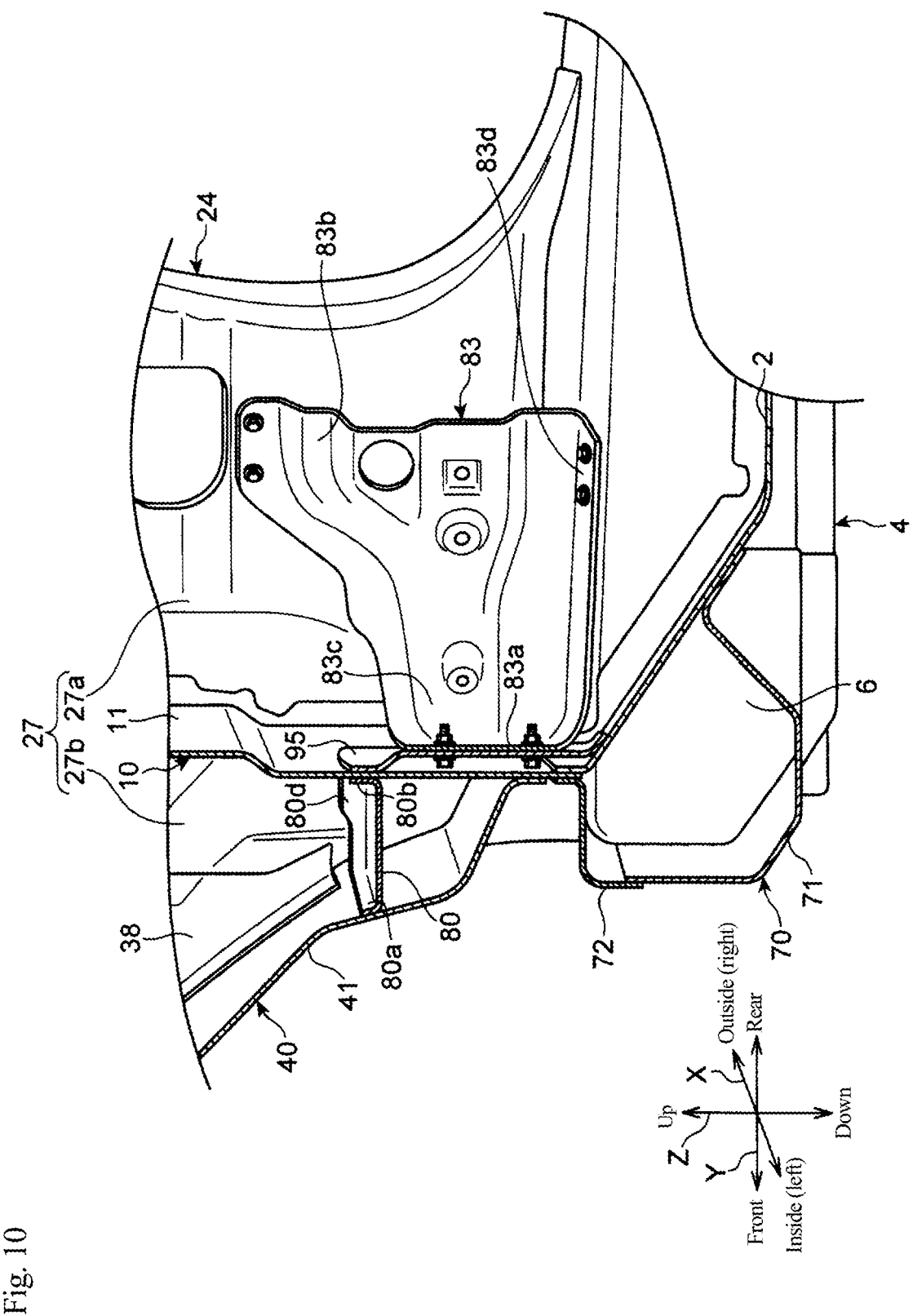
FIG. 10 is a sectional view taken along a line D-D in FIG. 8, and illustrates a reinforcing member spreading over a dash panel and the hinge pillar and the periphery of the reinforcing member when viewed from the inside in the vehicle width direction.

As illustrated in FIGS. 6 and 10, a reinforcing member 83 spreading over the dash panel lower 11 and the hinge pillar inner 27a is disposed on the vehicle rear side of the dash panel lower 11. The reinforcing member 83 is a plate-shaped member including a front surface portion 83a facing the vehicle rear side of the dash panel lower 11, a side surface portion 83b facing the inside in the vehicle width direction X of the hinge pillar inner 27a, and a curved portion 83c integrally connecting the front surface portion 83a and the side surface portion 83b.

The front surface portion 83a of the reinforcing member 83 is coupled to the dash panel lower 11 with, for example, a bracket 95 interposed therebetween. The bracket 95 is provided so as to spread over the vicinity at the front end of the floor panel 2 and the dash panel lower 11, and is coupled to the dash panel lower 11 and the floor panel 2 by, for example, welding. The upper end of the bracket 95 is disposed so as to overlap the vehicle rear side of the rear flange 80b of the apron rear panel 80 with the dash panel lower 11 interposed therebetween. The front surface portion 83a of the reinforcing member 83 is disposed below the apron rear panel 80 in the vehicle vertical direction Z, and coupled to the bracket 95 with, for example, a bolt.

The side surface portion 83b of the reinforcing member 83 has a dimension larger than that of the front surface portion 83a in the vehicle vertical direction Z. The lower end of the side surface portion 83b is disposed below the apron rear panel 80, and the upper end of the side surface portion 83b is disposed above the apron rear panel 80. The upper end of the side surface portion 83b is joined to the hinge pillar inner portion 27a with, for example, a bolt.

The reinforcing member 83 further includes a flange 83d extending from the lower ends of the side surface portion 83b and the curved portion 83c to the inside in the vehicle width direction X, and the flange 83d is coupled to the upper surface of the side sill inner 6 with, for example, a bolt.

The reinforcing member 83 overlaps the apron rear panel 80 in the vehicle width direction X as illustrated in FIG. 6, and the reinforcing member 83 is disposed so as to overlap the apron rear panel 80 in the vehicle vertical direction Z as illustrated in FIG. 10. That is, the apron rear panel 80 overlaps the reinforcing member 83 in front view of the vehicle body.

Consequently, the load dispersed in the apron rear panel 80 from the relatively receding front wheel through the wheel house outer 42, the connecting member 52, the reinforcing member 81 in the closed section of the connecting member 52, and the cowl side panel 27b is effectively dispersed in the reinforcing member 83 on the vehicle rear side of the dash panel lower 11 through the dash panel lower 11, and effectively dispersed from the reinforcing member 83 to the hinge pillar 24 and the side sill 4.

As illustrated in FIG. 3, in the closed section of the hinge pillar 24, a reinforcing member 84 is provided adjacent to the vehicle rear side of the coupling portion between the front surface portion 25a of the hinge pillar outer 25 and the rear surface portion 52b of the connecting member 52. The reinforcing member 84 is a bulkhead member disposed at substantially right angles in the vehicle vertical direction Z, and vertically partitions the internal space of the hinge pillar 24.

The reinforcing member 84 includes a front flange 84a extending upward from the front edge of the reinforcing member 84 and a rear flange 84b extending downward from the rear edge of the reinforcing member 84. The reinforcing member 84 is coupled to the front surface portion 25a of the hinge pillar outer 25 at the front flange 84a, and the reinforcing member 84 is coupled to the rear surface portion 25b of the hinge pillar outer 25 at the rear flange 84b. The front flange 84a is coupled to the upper vicinity of the coupling portion between the front surface portion 25a of the hinge pillar outer 25 and the rear surface portion 52b of the connecting member 52.

The rigidity of the load input portion of the hinge pillar 24 from the connecting member 52 is effectively enhanced by providing the reinforcing member 84 in the closed section of the hinge pillar 24. For this reason, the impact load input from the relatively receding front wheel to the high-rigidity portion of the hinge pillar 24 through the connecting member 52 can effectively be dispersed from the hinge pillar 24 to each portion of the vehicle body through the side sill 4, the front pillar 60, and the like.

The load can effectively be dispersed to the vehicle rear side because the impact load input from the rear surface portion 52b of the connecting member 52 to the front surface portion 25a of the hinge pillar outer 25 is effectively dispersed to the rear surface portion 25b of the hinge pillar outer 25 through the reinforcing member 84.

Figure 11:
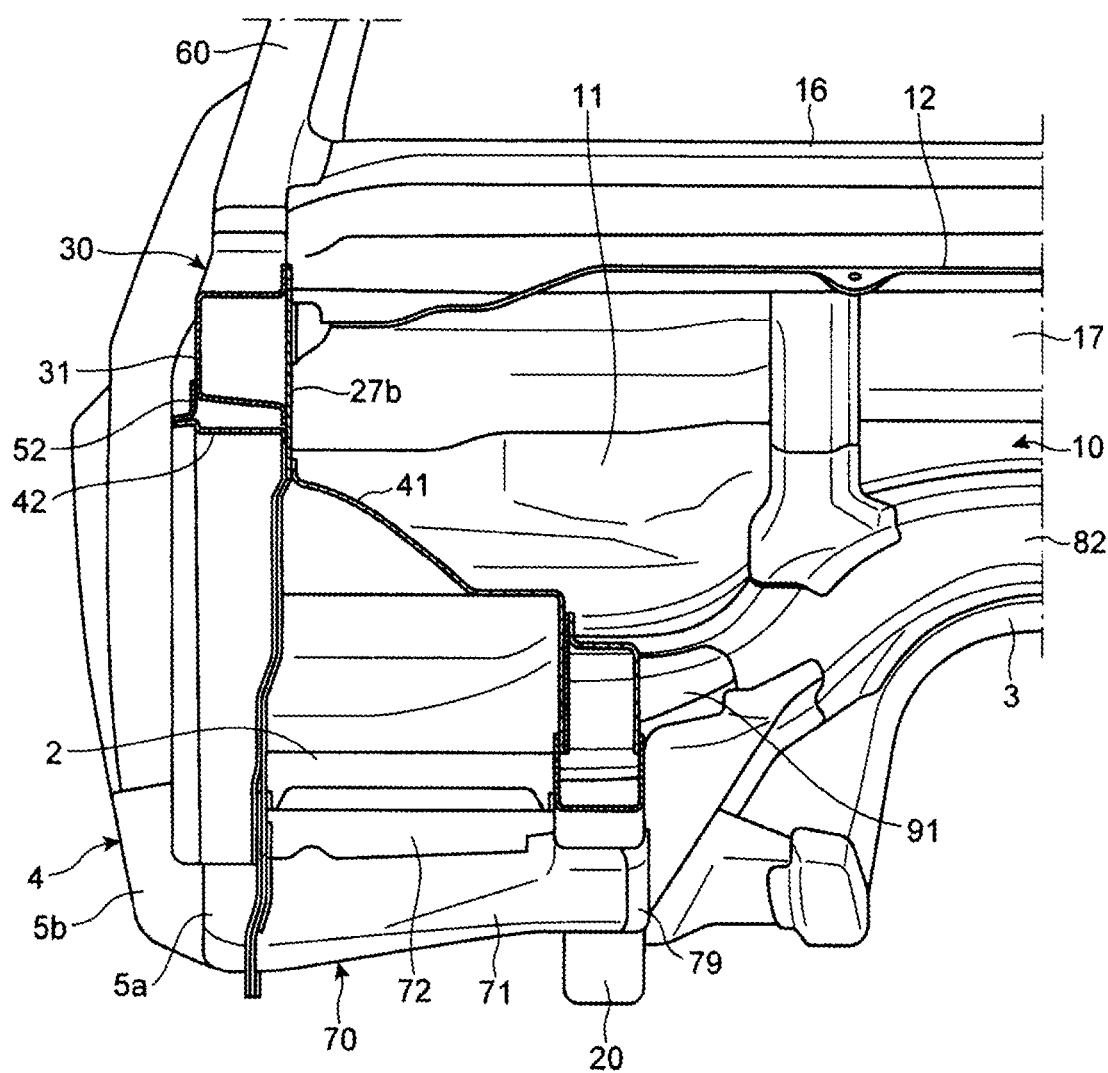
FIG. 11 is a sectional view taken along a line E-E in FIG. 8, and illustrates a torque box and its periphery when viewed from the front side of the vehicle body.
Figure 11:
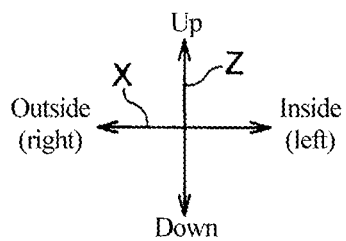
Figure 12:
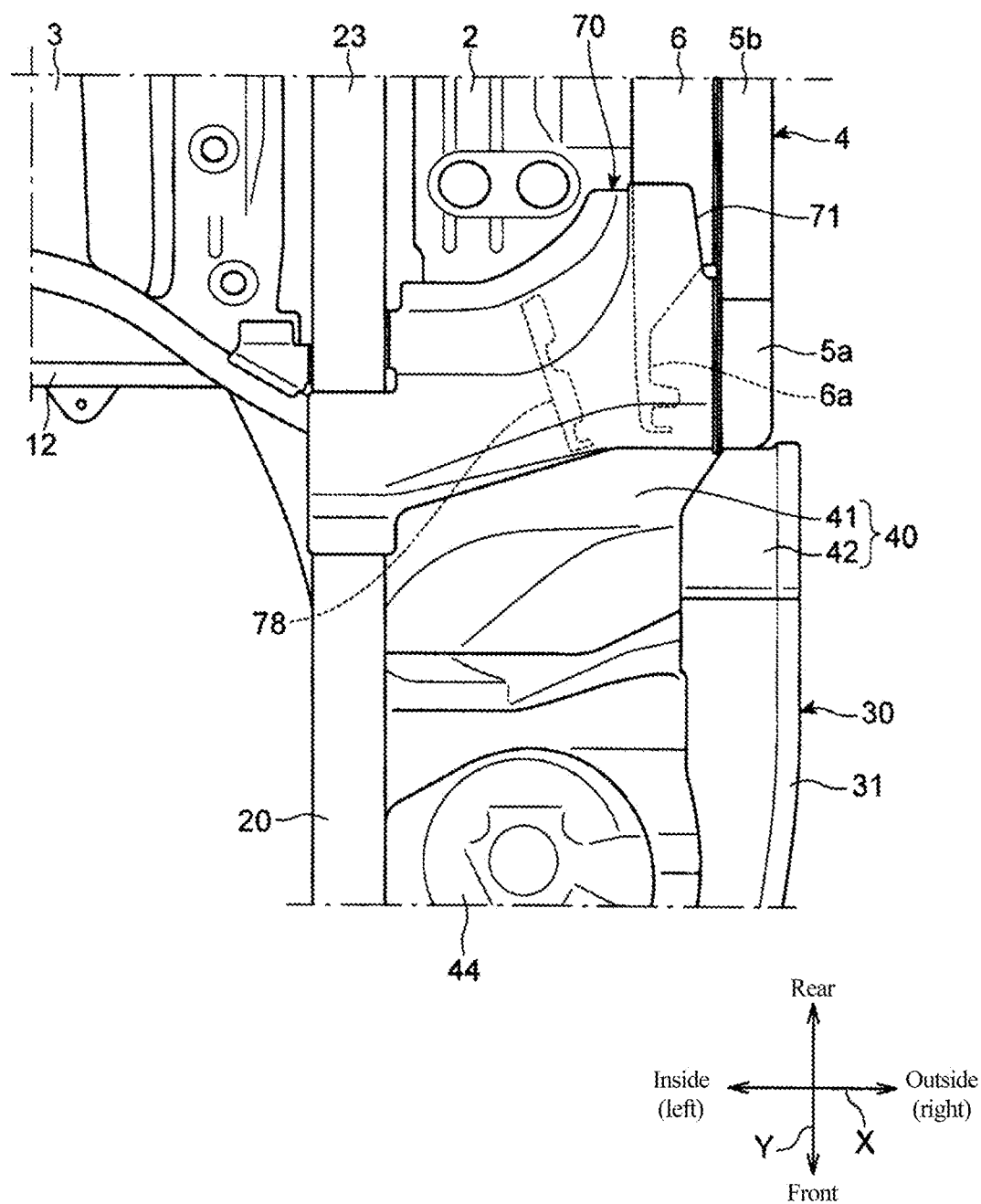
FIG. 12 is a bottom view illustrating the torque box and its periphery.

As illustrated in FIGS. 11 and 12, the automobile 1 includes a torque box 70 extending from the front end of the side sill 4 toward the inside in the vehicle width direction X. The torque box 70 connects the front end of the side sill 4 and the rear end of the front side frame 20. Consequently, torsion of the front side frame 20 is prevented by the side sill 4 through the torque box 70, thereby improving the driving stability of the automobile 1.

As illustrated in FIG. 10, the torque box 70 includes a groove-shaped torque box lower 71 that is open upward while extending in the vehicle width direction X, a plate-shaped torque box upper 72 that is elongated in the vehicle width direction X while disposed above the torque box lower 71.

The ends on the vehicle front side of the torque box lower 71 and the torque box upper 72 are coupled to each other. The torque box lower 71 is coupled to the lower surface of the floor panel 2 at the end on the vehicle rear side of the torque box lower 71, and the torque box upper 72 is coupled to the front surface of the dash panel lower 11 at the end on the vehicle rear side of the torque box upper 72.

As illustrated in FIG. 9, the torque box lower 71 includes a lower surface portion 71a constituting the lower surface of the torque box 70, and the lower surface portion 71a is disposed at substantially right angles in the vehicle vertical direction Z. The lower surface portion 71a is coupled to the lower surface of the front side frame 20 at the end portion inside the vehicle width direction X with, for example, a bracket 79 interposed therebetween, and coupled to the cowl side panel 27b at the end on the outside in the vehicle width direction X.

The torque box upper 72 includes an upper surface portion 72a constituting the upper surface of the torque box 70, and the upper surface portion 72a is disposed at substantially right angles in the vehicle vertical direction Z. The upper surface portion 72a is coupled to the side surface of the front side frame 20 at the end on the inside in the vehicle width direction X of the upper surface portion 72a, and coupled to the cowl side panel 27b at the end on the outside in the vehicle width direction X.

The torque box lower 71 and the torque box upper 72 are disposed so as to overlap the side sill inner 6 in the vehicle width direction X. The front end portion 6a (see FIG. 12) of the side sill inner 6 is disposed between the lower surface portion 71a and the upper surface portion 72a of the torque box 70 in the vehicle vertical direction Z.

As illustrated in FIG. 10, inside in the vehicle width direction X with respect to the side sill inner 6, a closed section continuous in the vehicle width direction X is formed among the torque box lower 71, the torque box upper 72 and the floor panel 2. In the description, the closed section is referred to as a "closed section of the torque box 70".

As illustrated in FIG. 9, the torque box 70 is coupled to the front side sill outer 5a with the cowl side panel 27h interposed therebetween. The front side sill outer 5a is a member having a hat shape in section as a whole, and the front side sill outer 5a includes a side surface portion 96 that is disposed on the outside in the vehicle width direction X of the cowl side panel 27b at a distance from the cowl side panel 27b while facing the cowl side panel 27b, and an upper surface portion 97 extending from the upper edge of the side surface portion 96 toward the inside in the vehicle width direction X, and a lower surface portion 98 extending from the lower edge of the side surface portion 96 toward the inside in the vehicle width direction X.

Each of the upper surface portion 97 and the lower surface portion 98 of the front side sill outer 5a is coupled to the cowl side panel 27h at the end on the inside in the vehicle width direction X, thereby forming the closed section between the front side sill outer 5a and the cowl side panel 27b.

The front side sill outer 5a is made of a material having lower tensile strength than materials for the rear side sill outer 5b, the torque box lower 71 and the torque box upper 72. Consequently, the front side sill outer 5a is lower than the rear side sill outer 5b, the torque box lower 71, and the torque box upper 72 in a proof stress against the impact load from the vehicle front side. The materials for the rear side sill outer 5b, the torque box lower 71 and the torque box upper 72 have the similar tensile strength.

The upper surface portion 72a of the torque box 70 is disposed at the substantially same height as the upper surface portion 97 of the front side sill outer 5a in the vehicle vertical direction Z. The upper surface portion 72a of the torque box 70 is disposed so as to overlap the inside in the vehicle width direction X of the upper surface portion 97 of the front side sill outer 5a with the cowl side panel 27h interposed therebetween. That is, the upper surface portion 72a of the torque box 70 and the upper surface portion 97 of the front side sill outer 5a are coupled to the cowl side panel 27b at the substantially same height position in the vehicle vertical direction Z.

The lower surface portion 71a of the torque box 70 is disposed at the substantially same height as the lower surface portion 98 of the front side sill outer 5a in the vehicle vertical direction Z. The lower surface portion 71a of the torque box 70 is disposed so as to overlap the inside in the vehicle width direction X of the lower surface portion 98 of the front side sill outer 5a with the cowl side panel 27h interposed therebetween. That is, the lower surface portion 71a of the torque box 70 and the lower surface portion 98 of the front side sill outer 5a are coupled to the cowl side panel 27b at the substantially same height position in the vehicle vertical direction Z.

A reinforcing member 78 is disposed in the closed section of the torque box 70, thereby enhancing the rigidity of the torque box 70. The reinforcing member 78 is a plate-shaped bulkhead member that partitions the internal space of the torque box 70 in the vehicle width direction X.

Figure 13:
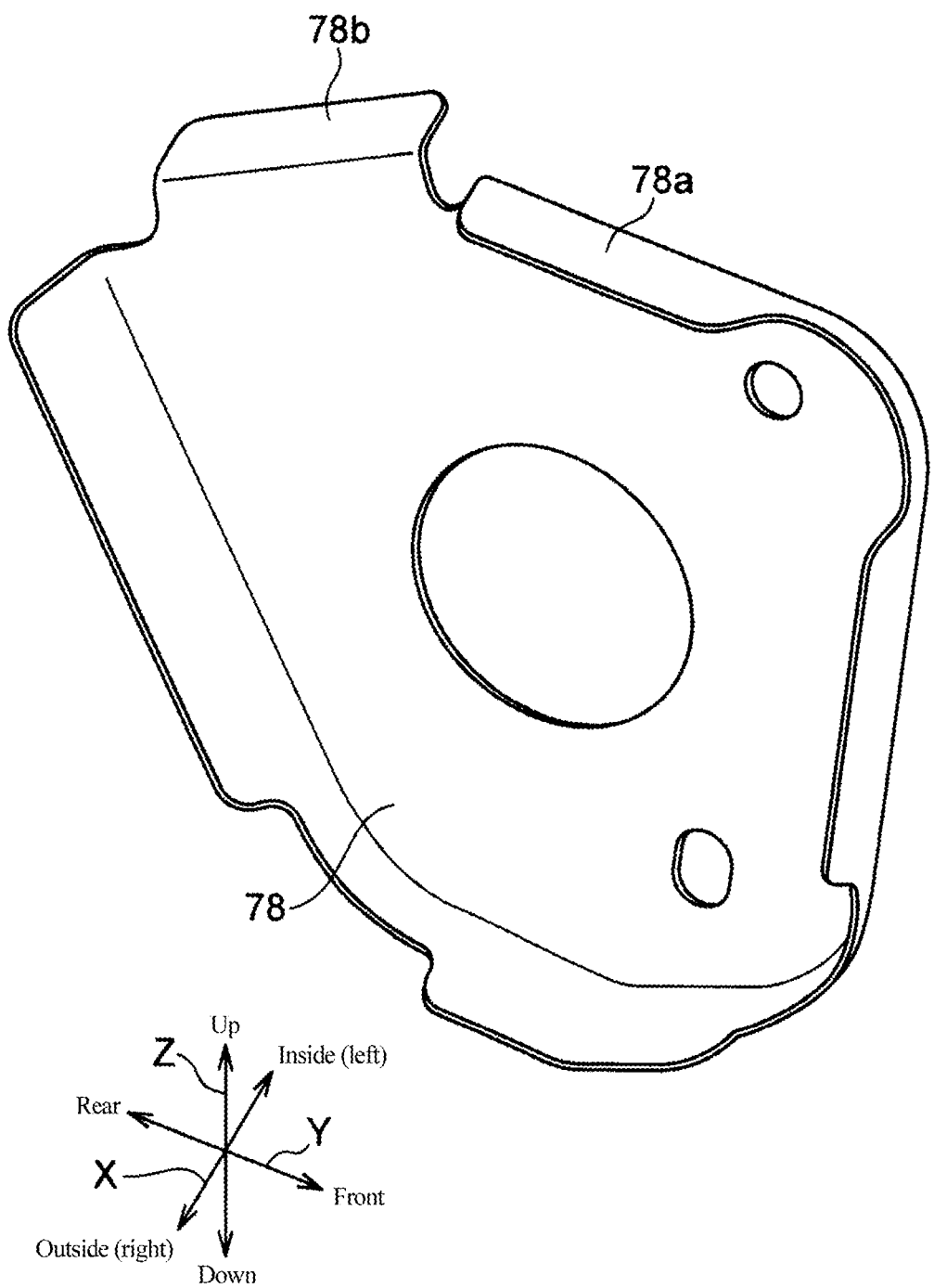
FIG. 13 is a perspective view illustrating the reinforcing member in the torque box.

As illustrated in FIG. 13, for example, a pair of flanges 78a, 78b is provided on the peripheral edge of the reinforcing member 78. The flange 78a is provided so as to extend from most of the peripheral edge of the reinforcing member 78 to, for example, the outside in the vehicle width direction X, and coupled to the inner surfaces of the torque box lower 71 and the torque box upper 72. The flange 78b is provided so as to extend from the remaining portion of the peripheral edge of the reinforcing member 78 to, for example, the inside in the vehicle width direction X, and coupled to the lower surface of the floor panel 2.

By the provision of the torque box 70, when such an impact load that the front wheel recedes relative to the vehicle body is input from the vehicle front side, the impact load that is input from the front wheel to the front end of the side sill 4 through the connecting member 52, the hinge pillar 24, or the like or directly input to the front end of the side sill 4 is dispersed toward the vehicle rear side through the side sill 4, and effectively dispersed from the upper surface portion 97 and the lower surface portion 98 of the front side sill outer 5a to the upper surface portion 72a and the lower surface portion 71a of the torque box 70. Consequently, the load can be dispersed in the front side frame 20 or the like from the front end of the side sill 4 toward the inside in the vehicle width direction X using the torque box 70 provided to improve the driving stability of the vehicle.

Because the rigidity of the torque box 70 is enhanced by providing the reinforcing member 78 in the closed section of the torque box 70, the deformation of the closed section of the torque box 70 is effectively prevented. Consequently, the load can successfully be transmitted to the inside in the vehicle width direction X through the upper surface portion 72a and the lower surface portion 71a by preventing the deformation of the upper surface portion 72a and the lower surface portion 71a of the torque box 70.

The load transmitted from the torque box 70 to the front side frame 20 is dispersed to the vehicle rear side through the front side frame 20 and the side frame 23 (see FIG. 12) continuing to the vehicle rear side of the front side frame 20, dispersed to the dash panel lower 11 or the floor panel 2, or dispersed to the floor tunnel 3 (see FIG. 11) through the reinforcing member 82 (see FIGS. 9 and 11). Thus, the deformation of the vehicle interior is effectively prevented by effectively distributing the impact load to each portion of the vehicle body.

When the impact load from the front wheel that recedes relative to the vehicle body is input to the front side sill outer 5a through the connecting member 52, the hinge pillar 24, or the like or directly input to the front side sill outer 5a, the front side sill outer 5a having lower proof stress against the impact load from the vehicle front side than the torque box 70 is crushed, and buckling of the torque box 70 is prevented while impact energy is effectively absorbed, so that the load can effectively be dispersed to the inside in the vehicle width direction X through the upper surface portion 72a and the lower surface portion 71a of the torque box 70.

Although the present invention is described with the embodiment as an example, the present invention is not limited to the embodiment.

For example, in the embodiment, the torque box 70 is constructed with the torque box lower 71 and the torque box upper 72, but the torque box 70 may be constructed with one or at least three members.

In the embodiment, the bulkhead member is used as the reinforcing member 78 in the torque box 70 by way of example, but a foam filler may be used instead of the bulkhead member.

INDUSTRIAL APPLICABILITY

As described above, in the present invention, such an impact load that the front wheel recedes relatively can effectively be dispersed to each portion of the vehicle body through the torque box when input from the vehicle front side. Therefore, there is a possibility that the present invention is suitably used in the manufacturing industry field of the automobile including the torque box.

LIST OF REFERENCE CHARACTERS 1 automobile
2 floor panel
3 floor tunnel
4 side sill
5 side sill outer
5a front side sill outer
5b rear side sill outer
6 side sill inner
6a front end of side sill inner
10 dash panel
11 dash panel lower
12 dash panel upper
20 front side frame
24 hinge pillar
25 hinge pillar outer
27 side inner panel (side panel)
27a hinge pillar inner
27b cowl side panel
30 apron reinforcement
31 rear apron reinforcement
32 front apron reinforcement
40 wheel house
41 wheel house inner
42 wheel house outer
44 suspension housing
52 connecting member
60 front pillar
70 torque box
71 torque box lower
71a lower surface portion of torque box
72 torque box upper
72a upper surface portion of torque box
78 reinforcing member
79 bracket
80 apron rear panel
96 side surface portion of front side sill outer
97 upper surface portion of front side sill outer
98 lower surface portion of front side sill outer

The invention claimed is:

1. A vehicle front body structure comprising:
a side sill that extends in a vehicle front-rear direction and is located behind a position where a front wheel is disposed;
a hinge pillar extending upward from the side sill;
an apron reinforcement attached to an upper end of the hinge pillar and extending in the vehicle front-rear direction;
a connecting member diagonally connecting the hinge pillar and the apron reinforcement;
a wheel house provided under the apron reinforcement and accommodating the front wheel; and
a torque box extending from a front end of the side sill toward an inside in a vehicle width direction, wherein
the torque box includes an upper surface portion disposed at a substantially same height as an upper surface of the side sill and a lower surface portion disposed at a substantially same height as a lower surface of the side sill;
the wheel house includes a wheel house inner portion and a wheel house outer portion, the wheel house inner portion being disposed on the inside in the vehicle width direction, the wheel house outer portion being disposed on an outside in the vehicle width direction;
the wheel house outer portion is coupled to the connecting member so as to cover a front portion of the connecting member; and
a lower end of the wheel house outer portion contacts a front portion of the side sill.

2. The vehicle front body structure according to claim 1, wherein the torque box includes an internal space surrounded by the upper surface portion and the lower surface portion, and a reinforcing member is provided in the internal space.

3. The vehicle front body structure according to claim 2, wherein the reinforcing member is a plate-shaped member partitioning the internal space in the vehicle width direction.

4. The vehicle front body structure according to claim 1, wherein the front end of the side sill is made of a material having lower tensile strength than a material for the torque box.

5. The vehicle front body structure according to claim 1, further comprising:
a floor panel constituting a lower portion of a vehicle interior;
a dash panel lower portion rising from a front end of the floor panel toward a vehicle upper side; and
a dash panel upper portion coupled to an upper end of the dash panel lower portion, wherein:

the torque box includes a torque box upper portion and a torque box lower portion, the torque box upper portion forming part of an upper surface of the torque box, the torque box lower portion forming part of a lower surface of the torque box;
a front end of the torque box upper portion and a front end of the torque box lower portion are coupled to each other;
the torque box lower portion is coupled to the floor panel; and
the torque box upper portion is coupled to the dash panel lower portion.

\* \* \* \* \*